United States Patent
Shimanaka (10) Patent No.: US 12,528,457 B2
(45) Date of Patent: Jan. 20, 2026

(54) CONTROL DEVICE, CONTROL METHOD AND PROGRAM

(71) Applicant: TOYOTA JIDOSHA KABUSHIKI KAISHA, Toyota (JP)

(72) Inventor: Yumi Shimanaka, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 18/485,496

(22) Filed: Oct. 12, 2023

(65) Prior Publication Data
US 2024/0149870 A1    May 9, 2024

(30) Foreign Application Priority Data

Nov. 4, 2022  (JP) .................. 2022-177337

(51) Int. Cl.
| | | |
|---|---|---|
| B60W 30/09 | (2012.01) | |
| B60W 10/20 | (2006.01) | |
| B60W 30/095 | (2012.01) | |
| B60W 30/18 | (2012.01) | |
| B60W 40/072 | (2012.01) | |
| B60W 40/105 | (2012.01) | |

(52) U.S. Cl.
CPC ............ *B60W 30/09* (2013.01); *B60W 10/20* (2013.01); *B60W 30/0956* (2013.01); *B60W 30/18163* (2013.01); *B60W 40/072* (2013.01); *B60W 40/105* (2013.01); *B60W 2540/18* (2013.01); *B60W 2552/30* (2020.02); *B60W 2552/53* (2020.02)

(58) Field of Classification Search
CPC .. B60W 30/09; B60W 10/20; B60W 30/0956; B60W 30/18163; B60W 40/072; B60W 40/105; B60W 2540/18; B60W 2552/30; B60W 2552/53; B60W 2520/10; B60W 2554/805; B60W 2554/806; B60W 2710/207

See application file for complete search history.

(56) References Cited

U.S. PATENT DOCUMENTS

| | | |
|---|---|---|
| 9,105,190 B2 | 8/2015 | Akiyama |
| 9,393,960 B2 | 7/2016 | Kodaira |

(Continued)

FOREIGN PATENT DOCUMENTS

JP   2022-18618 A   1/2022

Primary Examiner — Ashley L Redhead, Jr.
(74) Attorney, Agent, or Firm — Sughrue Mion, PLLC (57) ABSTRACT

To effectively suppress collision with an oncoming vehicle while reducing a processing load of a processor, provided is a control device for a vehicle comprising an object detection unit configured to detect a object; and a processor. The the processor is configured to execute an estimation process for estimating whether an adjacent lane is an opposite lane, and a avoidance process which executes a steering control for avoiding a collision, when the object detected by the object detection unit satisfies a collision condition, wherein the estimation process, if it is estimated that the adjacent lane is the opposite lane, maintain an estimation result until a cancellation condition is satisfied, and wherein the avoidance process, when the collision condition is satisfied, if the adjacent lane is estimated to be the opposite lane, executes the steering control without causing the own vehicle to enter the adjacent lane.

6 Claims, 5 Drawing Sheets

(56) References Cited

U.S. PATENT DOCUMENTS

| | | | |
|---|---|---|---|
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2020/0353918 A1* | 11/2020 | Goto | B60W 30/095 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0162990 A1* | 6/2021 | Ide | B60W 30/18159 |
| 2021/0188261 A1* | 6/2021 | Song | B60W 40/105 |
| 2022/0017078 A1 | 1/2022 | Fukui et al. | |
| 2022/0169310 A1* | 6/2022 | Choi | B62D 15/029 |
| 2023/0073860 A1* | 3/2023 | Baek | B60W 30/18163 |
| 2023/0391320 A1* | 12/2023 | Mita | G08G 1/163 |
| 2024/0042996 A1* | 2/2024 | Park | B60W 40/02 |
| 2024/0375643 A1* | 11/2024 | Lennartsson | B60W 30/095 |
| 2025/0050875 A1* | 2/2025 | Iizuka | B60W 30/09 |

* cited by examiner

CONTROL DEVICE, CONTROL METHOD AND PROGRAM

CROSS-REFERENCE TO RELATED APPLICATION

This application claims priority to Japanese Patent Application No. JP2022-177337 filed on Nov. 4, 2022, the content of which is hereby incorporated by reference in its entirety into this application.

BACKGROUND OF THE INVENTION

1. Field of the Invention

The present disclosure relates to a control device, a control method, and a program for a vehicle.

2. Description of the Related Art

As a control device for vehicles, there is known a device that performs steering control for automatically controlling a steering angle of a steered wheel of a own vehicle so as to avoid a collision between a own vehicle and an object, when an object that is likely to collide in front of own vehicle is detected. For example, Japanese Patent Application Laid-Open (kokai) No. 2022-018618 (hereinafter Patent Document 1) discloses a control device that prohibits execution of steering control and releases prohibition of steering control after a predetermined time has elapsed since no oncoming lane is detected, when the adjacent lane is an oncoming lane and an oncoming vehicle traveling on the oncoming lane is detected.

When an attempt is made to constantly monitor whether an oncoming vehicle exists in an oncoming lane as in the apparatus described in Patent Document 1, there is a problem that a processing load of the processor increases. Also, when the device starts steering control by detecting the primary object, the oncoming vehicle is approaching own vehicle steering direction. In this situation, the oncoming vehicle is very fast relative to own vehicle. Therefore, at the timing when the steering control for the primary target is started, there is a possibility that the oncoming vehicle cannot be detected as a secondary object that may collide with own vehicle.

SUMMARY OF THE INVENTION

An object of the present disclosure is to effectively suppress collision with an oncoming vehicle while reducing a processing load of a processor.

A device according to at least one embodiment of the present disclosure is a control device for a vehicle comprising an object detection unit configured to detect an object existing in at least a front area of an own vehicle as a front object, and a processor. The processor is configured to execute an estimation process for estimating whether an adjacent lane adjoining an own lane on which the own vehicle is traveling is an opposite lane in which traveling direction of vehicle is opposite to the own lane, and a avoidance process which executes at least a steering control for avoiding a collision between the own vehicle and the object, when the object detected as the front object by the object detection unit satisfies a predetermined collision condition, wherein the estimation process, if it is estimated that the adjacent lane is the opposite lane, maintain an estimation result that the adjacent lane is the opposite lane until a predetermined cancellation condition is satisfied, and wherein the avoidance process, when the predetermined collision condition is satisfied, if the adjacent lane is estimated or estimated to be the opposite lane, executes the steering control without causing the own vehicle to enter the adjacent lane.

According to the above aspect, when the control device estimates that the adjacent lane is the opposite lane, the control device retains an estimation result that the adjacent lane is the opposite lane until a predetermined release condition is satisfied. In addition, when the avoidance process is performed, the control device performs the steering control without causing own vehicle to enter the adjacent lane if the neighboring lane is estimated to be the opposite lane or the estimation result is retained. This makes it possible to effectively suppress collision with the oncoming vehicle while reducing the processing load of the processor.

DESCRIPTION OF THE EMBODIMENTS

Description is now given of a control device, a control method, and a program for a vehicle according to at least one embodiment of the present disclosure with reference to the drawings.

[Hardware Configuration]

Figure 1:
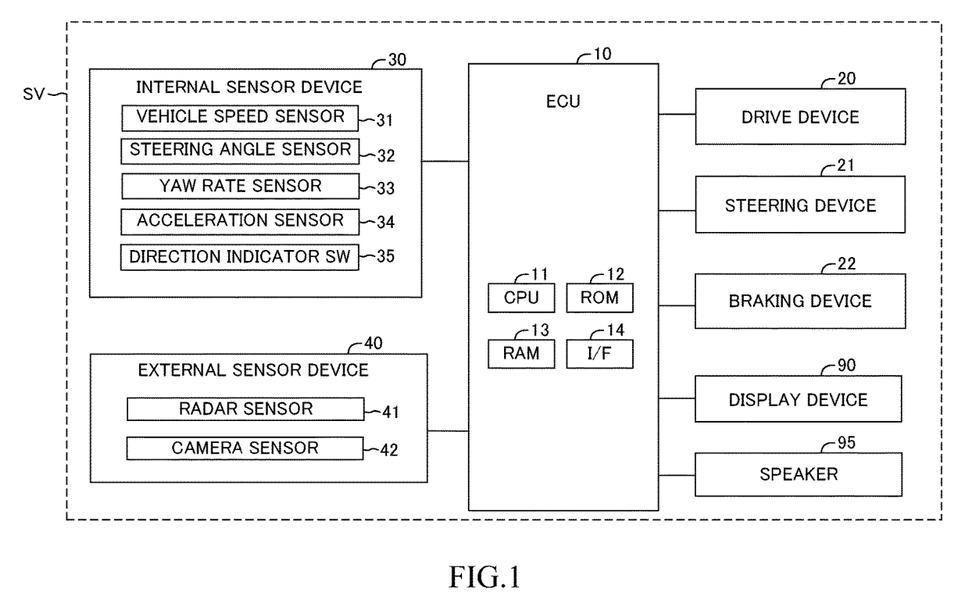
FIG. 1 is a schematic diagram showing a hardware configuration of a vehicle according to the present embodiment.

FIG. 1 is a schematic diagram of a hardware configuration of a vehicle SV according to the present embodiment. Hereinafter, the vehicle SV may be referred to as an own vehicle when it is required to distinguish it from other vehicles.

The vehicle SV has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assistance control of the vehicle SV, such as a collision avoidance control. Driving assistance control is a concept which encompasses automatic driving control. Therefore, a drive device 20, a steering device 21, a braking device 22, an internal sensor device 30, an external sensor device 40, a display device 90, a speaker 95, and the like are communicably connected to the ECU 10.

The drive device 20 generates a driving force to be transmitted to driving wheels of the vehicle SV. As the drive device 20, for example, an engine and a motor are given. In the device according to the at least one embodiment, the vehicle SV may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle SV. The braking device 22 applies a braking force to the wheels of the vehicle SV.

The internal sensor device 30 is sensors which acquire states of the vehicle SV. Specifically, the internal sensor device 30 includes a vehicle speed sensor 31, a steering angle sensor 32, a yaw rate sensor 33, an acceleration sensor 34, a direction indicator switch 35, and the like.

The vehicle speed sensor 31 detects a travel speed (vehicle speed V) of the vehicle SV. The steering angle sensor 32 detects a rotational angle of a steering wheel or a steering shaft (not shown) of the vehicle SV, that is, a steering angle. The yaw rate sensor 33 detects a yaw rate of the vehicle SV. The acceleration sensor 34 detects an acceleration of the vehicle SV. The direction indicator switch 35 detects an operation of a direction of an indicator lever (not shown) by the driver. The internal sensor device 30 transmits the condition of the vehicle SV detected by the sensors 31 to 35 to the ECU 10 at a predetermined cycle.

The external sensor device 40 is sensors which acquire object information on objects around the vehicle SV. Specifically, the periphery recognition device 40 includes a radar sensor 41, a camera sensor 42, and the like. As the object information, there are given, for example, a peripheral vehicle, a pedestrian, a bicycle, a division line of a road surface, a curb, a guardrail, a falling object, and the like.

The radar sensor 41 is provided in, for example, a front portion of the vehicle SV, and detects a target existing in a region located on the front side of the vehicle SV. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle SV and the target, a relative speed between the vehicle SV and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle SV, the relative distance between the vehicle SV and the target, the relative speed between the vehicle SV and the target, and the like.

The camera sensor 42 is, for example, a stereo camera or a monocular camera, and a digital camera including an image pickup element such as a CMOS sensor or a CCD sensor can be used as the camera sensor 42. The camera sensor 42 is arranged in, for example, a top portion of a front windshield glass of the vehicle SV. The camera sensor 42 captures a region in front of the vehicle SV, and processes captured image data, to thereby obtain the object information in front of the vehicle SV. The object information is information indicating a type of the target detected in front of the vehicle SV, the relative distance between the vehicle SV and the target, the relative speed between the vehicle SV and the target, and the like. It is only required to recognize the type of the target through, for example, machine learning such as pattern matching.

The external sensor device 40 repeatedly transmit the acquired object information to the ECU 10 each time a predetermined time elapses. The ECU 10 composes the relative relationship between the vehicle SV and the target acquired by the radar sensor 41 and the relative relationship between the vehicle SV and the target acquired by the camera sensor 42, to thereby determine a relative relationship between the vehicle SV and the target. It is not always required for the external sensor device 40 to include both of the radar sensor 41 and the camera sensor 42, and may include, for example, only the radar sensor 41 or only the camera sensor 42.

The display device 90 is, for example, a multi-information display, a head-up display, a display of a navigation system, or the like, and displays various images in accordance with a command from the ECU 10. The speaker 95 is, for example, a speaker of an audio system or a speaker of a navigation system, and outputs a warning sound or the like in response to a command from the ECU 10.

[Software Configuration]

Figure 2:
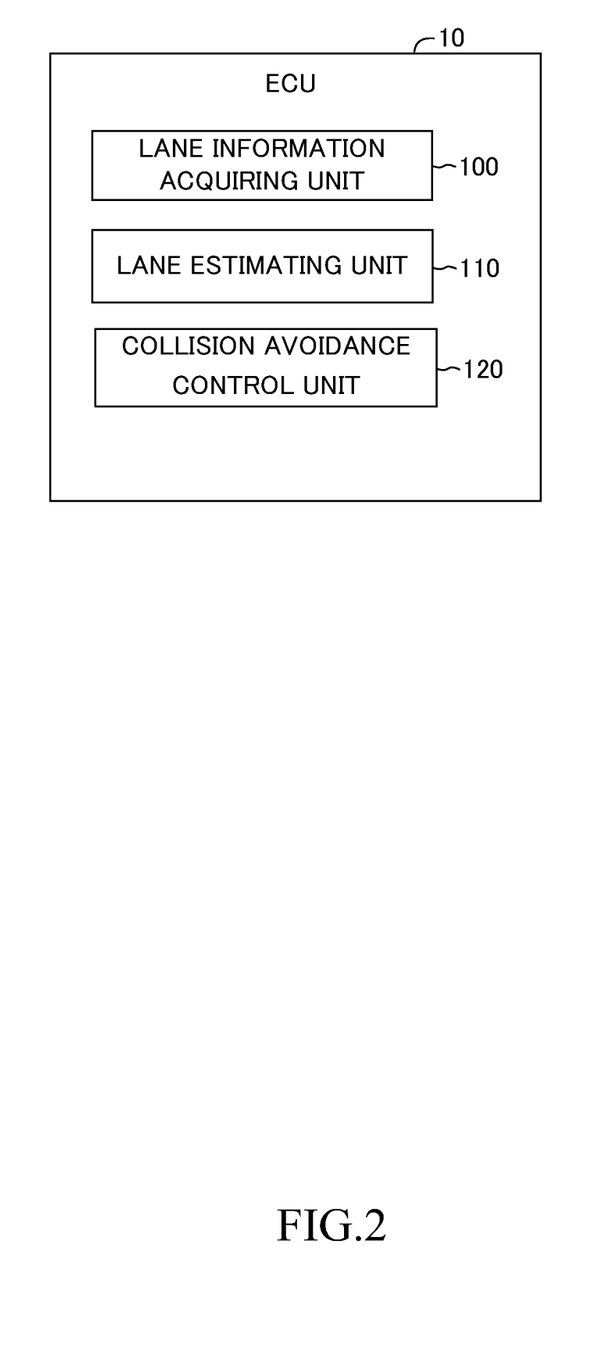
FIG. 2 is a schematic diagram showing a software configuration of a control device to the present embodiment.

FIG. 2 is a schematic diagram showing a software configuration of the ECU 10 to the present embodiment. As shown in FIG. 2, the ECU 10 includes a lane information acquiring unit 100, a lane estimating unit 110, a collision avoidance control unit 120, and the like as a part of functional elements. Those functional elements 100 to 120 are described as being included in the ECU 10 which is integrated hardware, but any part thereof may be provided to an ECU independent of the ECU 10. Moreover, a part of the functional elements 100 to 120 of the ECU 10 may be provided to an external information processing device of a facility (for example, a managing center) which can communicate to and from the vehicle SV.

The lane information acquiring unit 100 acquires lane information of a lane in which own vehicle SV is traveling (hereinafter, referred to as an own lane) and a lane adjacent to the own lane (hereinafter, referred to as an adjacent lane), based on the detection result of the external sensor device 40. Here, the own lane and the adjacent lane refer to a traveling area of a vehicle defined by a structure such as a curb, a guardrail, a wall, or the like as well as a dividing line such as a white line or a yellow line drawn on a road surface. In the following description, for the sake of convenience, the boundary of the traveling region defined by the dividing lines, structures, and the like is referred to as a "boundary line".

Figure 3:
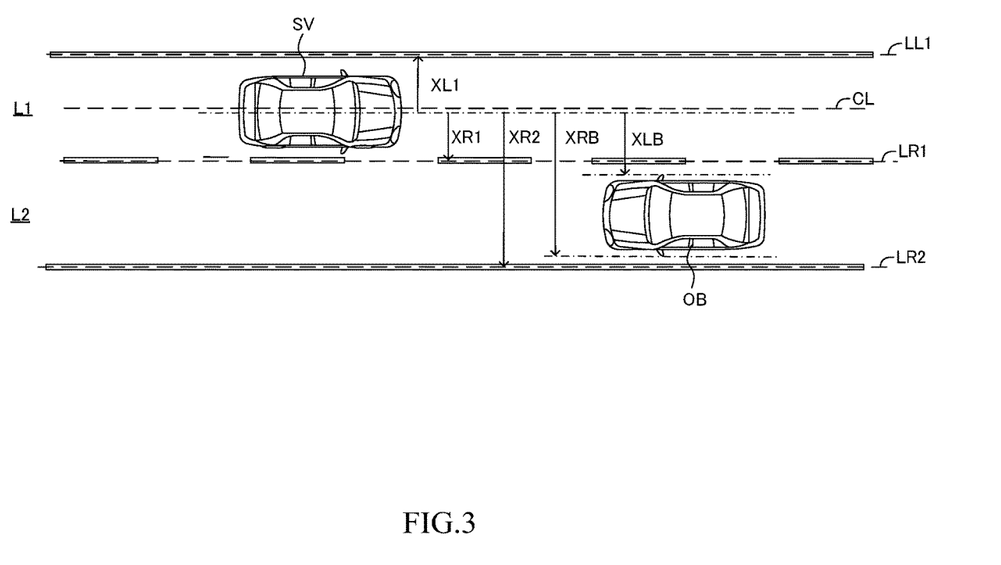
FIG. 3 is a schematic diagram illustrating an example of an own lane and an adjacent lane.

FIG. 3 is a schematic diagram illustrating an example of the own lane L1 and the adjacent lane L2 in which the lane information acquiring unit 100 acquires lane information. The lane information acquiring unit 100 acquires, as the lane information, a lateral position (a distance in the lane width direction with respect to own vehicle SV) of the own lane L1 and the respective border lines LL1, LR1, LR2 of the adjacent lane L2.

Specifically, the lane information acquiring unit 100 acquires, as the lane information of the own lane L1, the lateral position LL1 of the own-vehicle lane XL1 and the lateral position LR1 of the right boundary line XR1 based on the detection result of the external sensor device 40. Further, the lane information acquiring unit 100 calculates the first left boundary line LL1 and the curve radius R of the center line LC, which is the center position of the first right boundary line LR1, based on the detection result of the external sensor device 40, and acquires the calculated curve radius R as the lane information of the vehicle lane L1. Furthermore, the lane information acquiring unit 100 acquires, as the lane information of the adjacent lane L2, the lateral position LR2 of the adjacent lane XR2 on the basis of the detection result of the external sensor device 40. The lane information acquiring unit 100 transmits the acquired lane information of the own lane L1 and the adjacent lane L2 to the lane estimating unit 110.

In the embodiment illustrated in FIG. 3, the lane information acquiring unit 100 acquires the lane information of the adjacent lane L2 on the right side of the own lane L1 with respect to own vehicle SV, but when there is the adjacent lane on the left side of the own lane L1, the lane information of the adjacent lane on the left side as well as the adjacent lane L2 on the right side may be further acquired.

The lane estimating unit 110 estimates whether the adjacent lane L2 is the opposite lane or the same-direction lane based on the lane information transmitted from the lane information acquiring unit 100 and the target information in front of own vehicle SV acquired by the external sensor device 40. Here, the opposite lane refers to a lane in which the traveling direction of the vehicles is opposite to own vehicle SV among neighboring lanes. Further, the same direction lane refers to a lane in which the traveling direction of the vehicles is the same direction as own vehicle SV. The lane estimation unit 110 detects an object (hereinafter, referred to as a front object OB) such as another vehicle existing in front of the own vehicle SV based on the detection result of the external sensor device 40. The lane estimation unit 110 acquires the lateral position of the front object OB (the distance in the lane width direction with respect to own vehicle SV) based on the detection result of the external sensor device 40, when the front object OB is detected. Specifically, the lane estimation unit 110 acquires the lateral position OB of the left end of the front object XLB and the lateral position XRB of the right end of the front object, when viewed from the own vehicle SV.

The lane estimation unit 110 determines whether or not the first condition indicating that the front object OB exists in the adjacent lane L2 is satisfied. The first condition is satisfied, for example, when the lateral position XLB of the left end of the front object OB is larger than the lateral position XR2 of the right boundary line LR1 of the own lane L1 (XLB>XR1) and smaller than the lateral position LR2 of the right boundary line LR2 of the adjacent lane L2 in the lateral position XRB of the right end of the front object OB (XRB<XR2). When the first condition is satisfied, the lane estimation unit 110 determines whether or not the second condition in which the traveling direction of the front object OB is opposite to the traveling direction of own vehicle SV is satisfied. The second condition is satisfied, for example, when the velocity VOB of the front object OB is negative (VOB<0). That is, the second condition is not satisfied if the velocity VOB of the front object OB is the same as the vehicle velocity V of the own vehicle SV (the traveling direction is the same), even when the velocity VOB of the front object OB is lower than the vehicle velocity V of the own vehicle SV.

The lane estimation unit 110 estimates the adjacent lane L2 as the opposite lane, when the first condition is satisfied and the second condition is satisfied. When the adjacent lane L2 is estimated to be the opposite lane, the lane estimation unit 110 turns on the opposite lane flag F1 (F1=1). When the opposite lane flag F1 is turned on, the lane estimation unit 110 continues to hold the opposite lane flag F1 on (F1=1) until a cancellation condition is satisfied.

The lane estimation unit 110 estimates the adjacent lane L2 as the same direction lane, when the first condition is satisfied and the second condition is not satisfied and the opposite lane flag F1 is off (F1=0). When the adjacent lane L2 is estimated to be the same direction lane, the lane estimation unit 110 turns on a same direction lane flag F2 (F2=1). On the other hand, even when the first condition is satisfied and the second condition is not satisfied, the lane estimation unit 110 does not estimate the adjacent lane L2 as the same direction lane when the opposite lane flag F1 is on (F1=1). That is, the lane estimation unit 110 maintains the opposite lane flag F1 on (F1=1) without switching the opposite lane flag F1 from on to off. As described above, once the adjacent lane L2 is estimated to be the opposite lane, the estimation result that the adjacent lane L2 is the opposite lane is maintained until the release condition to be described later is satisfied. That is, the opposite lane flag F1 is maintained at ON (F1=1). This eliminates the need to constantly monitor whether the adjacent lane L2 is the oncoming lane, i.e., whether the oncoming vehicle is present, thereby effectively reducing the CPU 11 process loads.

The lane estimation unit 110 turns on the opposite lane flag F1 or turns on the same direction lane flag F2, and then switches the flag F1, F2 from on to off when any of the following cancellation conditions are satisfied.

Cancellation condition (1): When the external sensor device 40 cannot recognize at least one of the boundary line LL1, LR1 of the own lane L1 and the boundary line LR2 of the adjacent lane L2.

Cancellation condition (2): When the steering angle θ of own vehicle SV acquired by the steering angle sensor 32 exceeds the predetermined threshold value steering angle θv.

Cancellation condition (3): When the curve radius R of the own lane L1 acquired by the lane information acquiring unit 100 exceeds a predetermined threshold radius Rv.

Cancellation condition (4): When the turn signal switch 35 detects a left or right action of the turn signal lever by the occupant of own vehicle SV.

When the cancellation condition (1) is satisfied, that is, when the external sensor device 40 loses sight of the border line LL1, LR1, LR2, the lane estimation unit 110 cannot estimate whether the adjacent lane L2 is the opposite lane or the same direction lane. When any one of the cancellation conditions (2), (3), and (4) is satisfied, the accuracy of recognizing the border line LL1, LR1, LR2 by the external sensor device 40 decreases due to a large change in the behavior of the vehicle SV. When any one of the cancellation conditions (1), (2), (3), and (4) is satisfied, erroneous determination can be effectively prevented by switching the opposite lane flag F1 and the same direction lane flag F2 from on to off. The predetermined threshold value steering angle θv of the cancellation condition (2) and the predetermined threshold radius Rv of the cancellation condition (3) may be fixed values or may be variable values. When the predetermined threshold value steering angle θv is set to a variable value, for example, the predetermined threshold value steering angle θv may be decreased as the vehicle speed V increases.

The collision avoidance control unit 120 executes the collision avoidance control for avoiding collision between own vehicle SV and the front object or reducing damage to the collision. Specifically, the collision avoidance control unit 120 obtains the coordinate information of the object existing in front of the vehicle SV based on the object information transmitted from the external sensor device 40. Further, the collision avoidance control unit 120 calculates the turning radius of the vehicle SV based on the detection results of the vehicle speed sensor 31, the steering angle sensor 32, and the yaw rate sensor 33, and calculates the trajectory of the vehicle SV based on the turning radius. The collision avoidance control unit 120 determines whether the object in front of own vehicle SV is obstacle that may collide with the vehicle SV. When the object is a moving object, the collision avoidance control unit 120 determines the moving object as an obstacle, when the trajectory of the moving object and the trajectory of the vehicle SV intersect each other. When the object is a stationary object, the collision avoidance control unit 120 determines that the stationary object is an obstacle when the trajectory of the vehicle SV intersects the present position of the stationary object.

When the collision avoidance control unit 120 determines that the object is an obstacle, the collision avoidance control unit 120 calculates a predicted collision time (Time To Collision: TTC) until the vehicle SV collides with the obstacle based on the distance L from the vehicle SV to the obstacle and the relative velocity Vr of the vehicle SV with respect to the obstacle. TTC is an index indicating a possibility that the vehicle SV collides with an obstacle. TTC can be determined by dividing the distance L from own vehicle SV to the obstacle by the relative velocity Vr (TTC=L/Vr).

The collision avoidance control unit 120 determines that the vehicle SV is highly likely to collide with the obstacle when the state in which TTC is equal to or smaller than the predetermined collision determination threshold Tv. When determining that there is a high possibility of collision, the collision avoidance control unit 120 executes an alarm by the speaker 95 or the display device 90, and searches for an avoidance path for avoiding collision between the own vehicle SV and the obstacle.

Here, if the avoidance path is set in the adjacent lane L2 when the adjacent lane L2 is the opposite lane, that is, when the opposite lane flag F1 is on (F1=1), even if collision with the obstacle (first object) can be avoided, collision with the opposite vehicle (second object) traveling in the adjacent lane L2 may be caused. The collision avoidance control unit 120 searches for the avoidance path in an area including the adjacent lane L2, When the opposite lane flag F1 is off (F1=0). On the other hand, when the opposite lane flag F1 is on (F1=1), the collision avoidance control unit 120 searches for the avoidance path in the own lane L1. As a result, the own vehicle SV can be effectively prevented from entering the adjacent lane L2 by the steering control described later and colliding with the oncoming vehicle traveling on the adjacent lane L2.

When the avoidance path is set, the collision avoidance control unit 120 calculates a target steering angle required to cause own vehicle SV to travel along the avoidance path, and controls the operation of the steering device 21 based on the calculated target steering angle. Thus, a steering control is realized in which the steered wheel of the own vehicle SV is steered to avoid a collision or reduce damage between own vehicle SV and the obstacle. When the avoidance path cannot be set, the collision avoidance control unit 120 controls the operation of the braking device 22 based on the predetermined target deceleration, thereby executing deceleration control for decelerating the own vehicle SV in the own lane L1.

Figure 4:
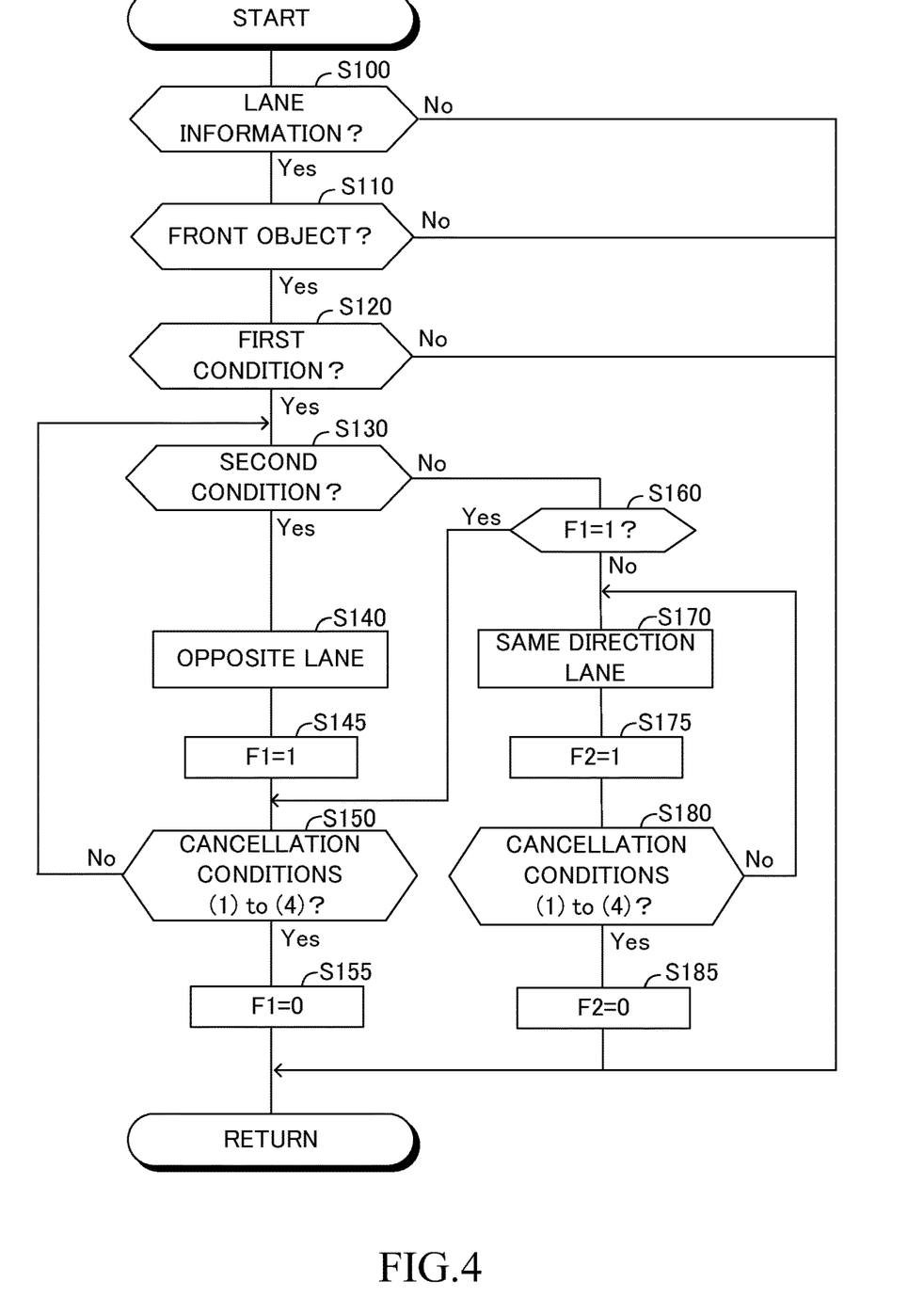
FIG. 4 is a flowchart for explaining a routine of a lane estimation processing.

FIG. 4 is a flowchart for explaining the routine of the lane estimation process by the CPU 11 of the ECU 10. This routine is started, for example, when the vehicle SV travels.

In step S100, the ECU 10 determines whether or not the lane information of the own lane L1 and the adjacent lane L2 has been acquired based on the detection result of the external sensor device 40. If the lane information is acquired (Yes), the ECU 10 advances the process to step S110. On the other hand, if the lane information is not obtained (No), the ECU 10 returns this routine.

In step S110, the ECU 10 determines whether or not the front object OB has been detected based on the detection result of the external sensor device 40. If the front object OB is detected (Yes), the ECU 10 advances the process to step S120. On the other hand, if the front object OB is not detected (No), the ECU 10 returns this routine.

In step S120, the ECU 10 determines whether the first condition, in which the front object OB is present in the adjacent lane L2, is satisfied. The ECU 10 determines that the first condition is satisfied, when the lateral position XLB of the left end of the front object OB is larger than the lateral position XR1 of the right boundary line LR1 of the own lane L1 (XLB>XR1), and the lateral position XRB of the right end of the front object OB is smaller than the lateral position XR2 of the right boundary line LR2 of the adjacent lane L2 (XRB<XR2). When the first condition is satisfied (Yes), the ECU 10 advances the process to step S130. On the other hand, if the first condition is not satisfied (No), the ECU 10 returns this routine.

In step S130, the ECU 10 determines whether or not the second condition is satisfied in which the front object OB travels in a direction opposite to the direction of travel of the own vehicle SV. When the velocity VOB of the front object OB is negative (VOB<0), the ECU 10 determines that the second criterion is satisfied. If the second condition is satisfied (Yes), the ECU 10 advances the process to step S140.

In step S140, the ECU 10 estimates the adjacent lane L2 as the opposite lane. Next, in step S145, the ECU 10 turns on the opposite lane flag F1 (F1=1) and advances the process to step S150.

In step S150, the ECU 10 determines whether any one of the above-described cancellation conditions (1) to (4) is satisfied. If none of the cancellation conditions (1) to (4) is satisfied (No), the ECU 10 returns to the process of step S130. That is, the opposite lane flag F1 is continuously held on. On the other hand, if any one of the cancellation conditions (1) to (4) is satisfied (Yes), the ECU 10 advances the process to step S155, switches the opposite lane flag F1 to off (F1=0), and returns this routine.

If it is determined in step S130 that the second condition is not satisfied (No), the ECU 10 advances the process to step S160. In step S160, the ECU 10 determines whether or not the opposite lane flag F1 is set to ON (F1=1). If the opposite lane flag F1 is set to ON (F1=1) (Yes), the ECU 10 advances the process to step S150. That is, once the adjacent lane L2 is estimated to be the opposite lane, the estimation result of the opposite lane is retained without being overwritten until the cancellation condition is satisfied. On the other hand, if the opposite lane flag F1 is not set to ON (No), that is, when the opposite lane flag F1 is OFF (F1=0), the ECU 10 advances the process to step S170.

In step S170, the ECU 10 estimates the adjacent lane L2 as the same direction lane. Next, in step S175, the ECU 10 turns on the same direction lane flag F2 (F2=1), and advances the process to step S180.

In the S180, the ECU 10 determines whether any one of the above-described cancellation conditions (1) to (4) is satisfied. If none of the cancellation conditions (1) to (4) is satisfied (No), the ECU 10 returns the process to step S170. That is, the same direction lane flag F2 is continuously held on. On the other hand, if any one of the cancellation conditions (1) to (4) is satisfied (Yes), the ECU 10 advances the process to step S185, switches the same direction lane flag F2 to OFF (F2=0), and returns this routine.

Figure 5:
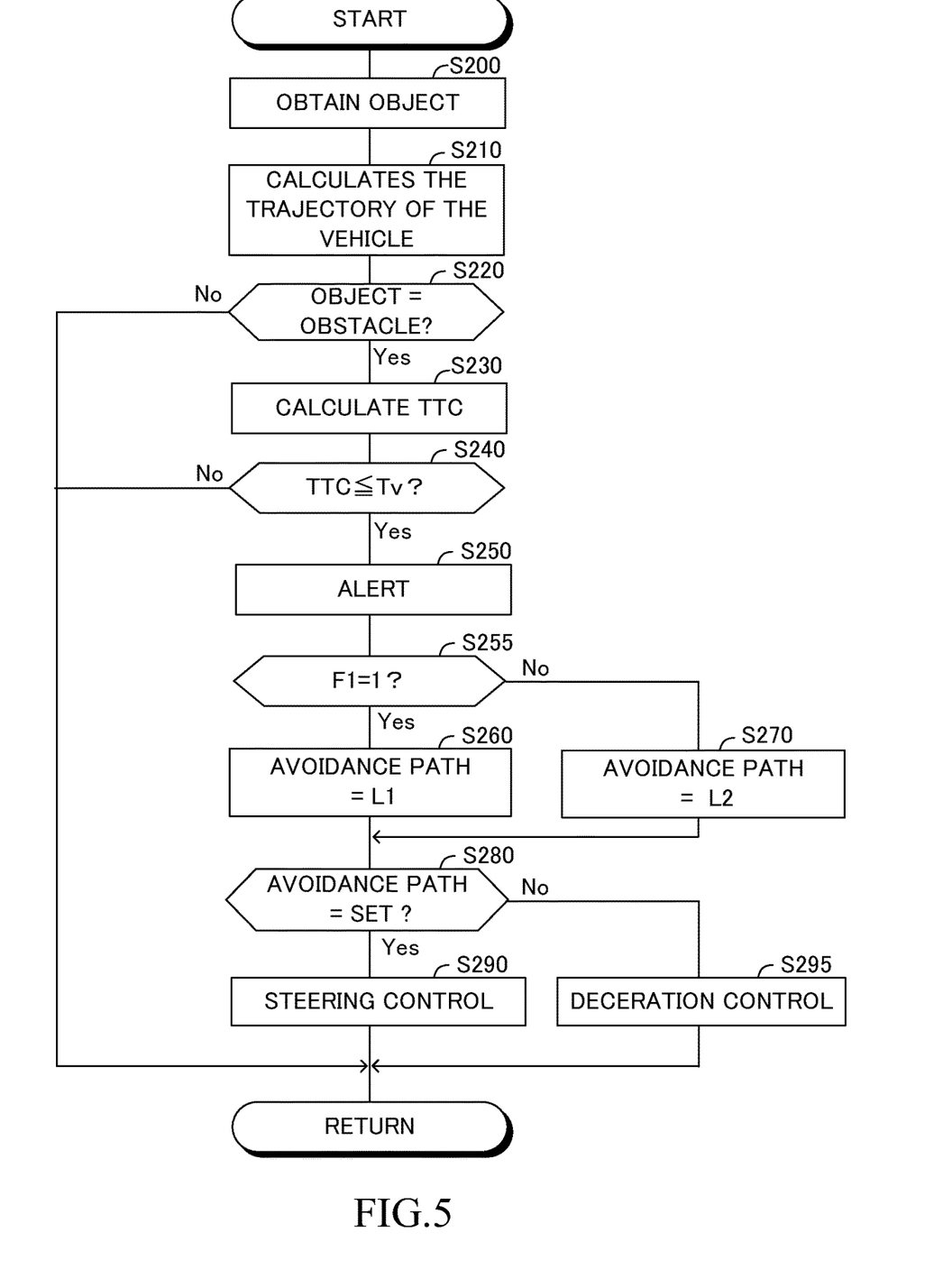
FIG. 5 is a flowchart for explaining a routine of a collision avoidance control processing.

FIG. 5 is the flow chart for explaining a routine of a process of the collision avoidance control by the CUP 11 of the ECU 10. This routine is started when the vehicle SV travels, and is executed in parallel with the routines of the lane estimation process shown in FIG. 4.

In step S200, the ECU 10 obtains the coordinate information of the object existing in the front area of the own vehicle SV based on the target information transmitted from the external sensor device 40. Next, in the step S210, the ECU 10 calculates the trajectory of the own vehicle SV based on the detection results of the vehicle speed sensor 31, the steering angle sensor 32, and the yaw rate sensor 33. Note that the processes of step S200 and step S210 are out of order and may be performed simultaneously.

In step S220, the ECU 10 determines whether the object in front of the own vehicle SV is the obstacle that may collide with the own vehicle SV. If the object is the moving object, the ECU 10 determines that the moving object is the obstacle when the trajectory of the moving object intersects the trajectory of the own vehicle SV. In addition, the ECU 10 determines that the stationary object is the obstacle when the trajectory of the own vehicle SV intersects the present position of the stationary object. When the ECU 10 determines that the object in front of the vehicle SV is the obstacle (Yes), the ECU 10 advances the process to step S230. On the other hand, if the ECU 10 determines that the object in front of the vehicle SV is not the obstacle (No), the ECU 10 returns this routine.

In step S230, the ECU 10 calculates the TTC by dividing the distance L from the own vehicle SV to the obstacle by the relative speed Vr (TTC=L/vr). Then, in step S240, the ECU 10 determines whether the TTC is less than or equal to the collision determination thresholds Tv. If the TTC is less than or equal to the collision determination threshold Tv (Yes), the ECU 10 advances the process to Step S250. On the other hand, if the TTC is larger than the collision determination threshold Tv (No), the ECU 10 returns this routine.

In step S250, the ECU 10 executes the alert. Next, in step S255, the ECU 10 determines whether or not the adjacent lane L2 is an opposite lane, that is, whether or not the determination opposite lane flag F1 is set to ON (F1=1). If the determination opposite lane flag F1 is on (Yes), the ECU 10 advances the process to step S260 and searches for the avoidance path in the own lane L1. On the other hand, if the determination opposite lane flag F1 is not set (No), the ECU 10 advances the process to step S270 and searches for an avoidance path in the region including the adjacent lane L2.

In step S280, the ECU 10 determines whether or not an avoidance path has been set as a result of the search. If the avoidance path can be set (Yes), the ECU 10 advances the process to step S290, and starts steering control for controlling the operation of the steering device 21 based on the target steering angle for causing the own vehicle SV to travel along the avoidance path, and returns this routine. On the other hand, if the avoidance path cannot be set (No), the ECU 10 advances the process to step S295, and starts deceleration control for decelerating the own vehicle SV at a predetermined target deceleration within the own lane L1, and returns this routine.

According to the at least one embodiment described in detail above, the control device is configured to be capable of executing the estimation process of estimating whether the adjacent lane L2 adjoining the own lane L1 is an opposing lane, and the avoidance process of performing steering control for avoiding collision between the own vehicle SV and the obstacle when the obstacle ahead of own vehicle SV satisfies a predetermined collision condition. Further, when the control device estimates that the adjacent lane L2 is the opposite lane, the control device retains the estimation result that the adjacent lane L2 is the opposite lane until at least one of the cancellation conditions (1) to (4) is satisfied. Accordingly, the processing load of the CPU 11 can be reduced. Furthermore, when performing the avoidance process, the control device performs the steering control without causing the own vehicle SV to enter the adjacent lane L2 when the adjacent lane L2 is estimated to be the opposite lane or the estimation result is retained. This can effectively prevent the own vehicle SV from colliding with the oncoming vehicle.

In the above, the control device, the control method, and the program of the vehicle according to the at least one embodiment have been described, but the present disclosure is not limited to the above-mentioned at least one embodiment, and various modifications are possible within the range not departing from the object of the present disclosure.

For example, in the above embodiment, the lane estimation unit 110 estimates whether the adjacent lane L2 is the opposite lane based on the detection result of the external sensor device 40, but may estimate whether the adjacent lane L2 is the opposite lane based on the detection result of the external sensor device 40, the GPS device, the map database, the road information around the own vehicle SV obtained by V2X communication, and the like. Further, the application of the present disclosure is not limited to the vehicle capable of executing driving support, and can also be applied to the vehicle capable of executing automatic driving (including full automatic driving).

What is claimed is:

1. A control device for a vehicle, comprising:
an object detection unit configured to detect an object existing in at least a front area of an own vehicle as a front object; and
a processor,
wherein the processor is configured to execute
an estimation process for estimating whether an adjacent lane adjoining an own lane on which the own vehicle is traveling is an opposite lane in which traveling direction of vehicle is opposite to the own lane, and
an avoidance process which executes at least a steering control for avoiding a collision between the own vehicle and the object, when the object detected as the front object by the object detection unit satisfies a predetermined collision condition,
wherein the estimation process, if it is estimated that the adjacent lane is the opposite lane, maintain an estimation result that the adjacent lane is the opposite lane until a predetermined cancellation condition is satisfied, and
wherein the avoidance process, when the predetermined collision condition is satisfied, if the adjacent lane is estimated or estimated to be the opposite lane, executes the steering control without causing the own vehicle to enter the adjacent lane, and
wherein the predetermined cancellation condition includes at least a first condition in which a lane information of at least one of the own lane and the adjacent lane cannot be obtained, a second condition in which a steering angle of the own vehicle exceeds a predetermined threshold steering angle, a third condition in which a curve radius of the own lane in which the own vehicle is traveling exceeds a predetermined threshold radius, and a fourth condition in which the own vehicle changes the route from the own lane.

2. The control device for the vehicle according to claim 1, wherein the predetermined threshold steering angle of the second condition is set to a steering angle smaller as the vehicle speed of own vehicle increases.

3. A control method which is applied to a vehicle having an object detection unit configured to detect an object existing in at least a front area of an own vehicle as a front object, the control method comprising:

an estimation process for estimating whether an adjacent lane adjoining an own lane on which the own vehicle is traveling is an opposite lane in which traveling direction of vehicle is opposite to the own lane, and an avoidance process which executes at least a steering control for avoiding a collision between the own vehicle and the object, when the object detected as the front object by the object detection unit satisfies a predetermined collision condition, wherein the estimation process, if it is estimated that the adjacent lane is the opposite lane, maintain an estimation result that the adjacent lane is the opposite lane until a predetermined cancellation condition is satisfied, and wherein the avoidance process, when the predetermined collision condition is satisfied, if the adjacent lane is estimated or estimated to be the opposite lane, executes the steering control without causing the own vehicle to enter the adjacent lane, and wherein the predetermined cancellation condition includes at least a first condition in which a lane information of at least one of the own lane and the adjacent lane cannot be obtained, a second condition in which a steering angle of the own vehicle exceeds a predetermined threshold steering angle, a third condition in which a curve radius of the own lane in which the own vehicle is traveling exceeds a predetermined threshold radius, and a fourth condition in which the own vehicle changes the route from the own lane.

4. The control device for the vehicle according to claim 3, wherein the predetermined threshold steering angle of the second condition is set to a steering angle smaller as the vehicle speed of own vehicle increases.

5. A program for causing a processor of a control device of a vehicle having an object detection unit configured to detect an object existing in at least a front area of an own vehicle as a front object, to execute:

an estimation process for estimating whether an adjacent lane adjoining an own lane on which the own vehicle is traveling is an opposite lane in which traveling direction of vehicle is opposite to the own lane, and an avoidance process which executes at least a steering control for avoiding a collision between the own vehicle and the object, when the object detected as the front object by the object detection unit satisfies a predetermined collision condition, wherein the estimation process, if it is estimated that the adjacent lane is the opposite lane, maintain an estimation result that the adjacent lane is the opposite lane until a predetermined cancellation condition is satisfied, and wherein the avoidance process, when the predetermined collision condition is satisfied, if the adjacent lane is estimated or estimated to be the opposite lane, executes the steering control without causing the own vehicle to enter the adjacent lane, and wherein the predetermined cancellation condition includes at least a first condition in which a lane information of at least one of the own lane and the adjacent lane cannot be obtained, a second condition in which a steering angle of the own vehicle exceeds a predetermined threshold steering angle, a third condition in which a curve radius of the own lane in which the own vehicle is traveling exceeds a predetermined threshold radius, and a fourth condition in which the own vehicle changes the route from the own lane.

6. The control device for the vehicle according to claim 5, wherein the predetermined threshold steering angle of the second condition is set to a steering angle smaller as the vehicle speed of own vehicle increases.

* * * * *